United States Patent

[11] 3,601,913

[72] Inventor Michael D. Pollock
 Saratoga, Calif.
[21] Appl. No. 746,466
[22] Filed July 22, 1968
[45] Patented Aug. 31, 1971
[73] Assignee FMC Corporation
 San Jose, Calif.

[54] MAGNETIC TRANSACTION CARD AND METHOD IN FORMING THE SAME
 4 Claims, 9 Drawing Figs.

[52] U.S. Cl. ................................................ 40/2.2
[51] Int. Cl. ................................................ G09f 3/02
[50] Field of Search ................................. 346/135;
 101/369; 283/7; 40/2.2

[56] References Cited
 UNITED STATES PATENTS
3,015,267  1/1962  Dashew ......................... 101/369

3,245,697  4/1966  Nugent .......................... 40/2.2 X
2,939,958  6/1960  Andersson ..................... 101/369 X
 OTHER REFERENCES
 IBM Technical Disclosure Bulletin Vol. 3, No. 6 dated November, 1960, Page 8

Primary Examiner—Robert W. Michell
Assistant Examiner—Wenceslao J. Contreras
Attorneys—F. W. Anderson and C. E. Tripp ABSTRACT: A magnetic transaction card, employed for identifying the card holder and recording transactions, is formed with an identification article of nonmagnetic material, and with a layer of magnetic material on the identification article forming a magnetic field along a plane surface thereof. Imprinting means alter the magnetic transaction card so as to form coded indicia detectable visually, by touch and by magnetic sensing devices.

PATENTED AUG 31 1971
3,601,913
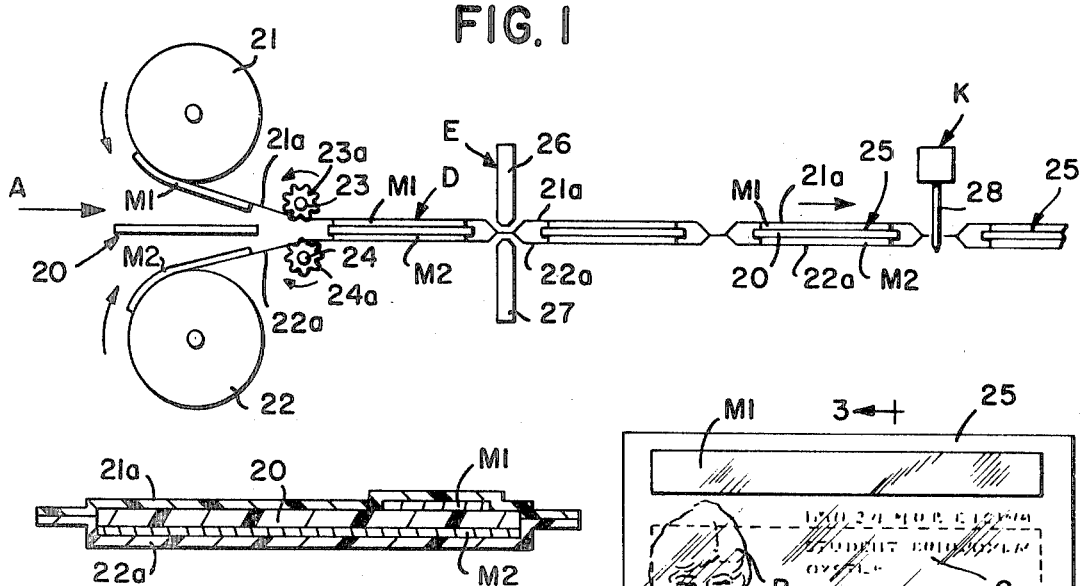
FIG. 1
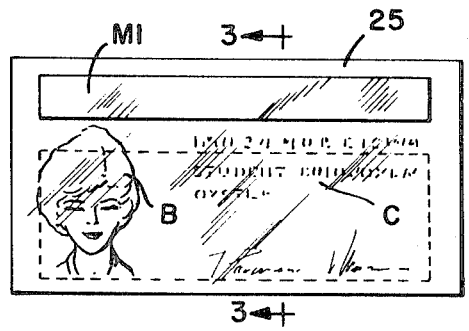
FIG. 3
FIG. 2
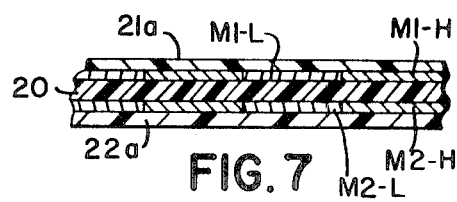
FIG. 4
FIG. 7
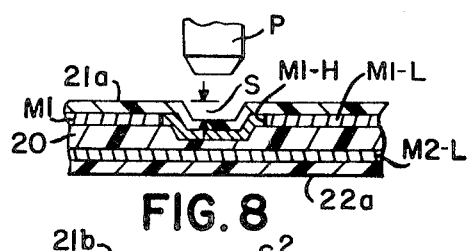
FIG. 5
FIG. 8
FIG. 9
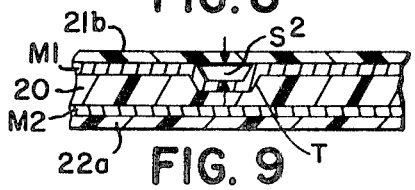
FIG. 6
*INVENTOR.*
MICHAEL D. POLLOCK
BY F. W. Anderson
C. C. Tripp
ATTORNEYS

MAGNETIC TRANSACTION CARD AND METHOD IN FORMING THE SAME

BACKGROUND OF THE INVENTION

Heretofore, identification or transaction cards were formed with a data bearing identification card interposed or laminated between layers of plastic material. However, such identification or transaction cards presented security problems of verification and the like. In instances in which transaction cards employed magnetic iron oxide or slugs, the nonmagnetic personalized identification card was lacking.

SUMMARY OF THE INVENTION

An object of the present invention is to provide a transaction card that includes a personalized identification card and, yet, can be verified.

Another object of the present invention is to provide a transaction card with a personalized identification card that has an improved arrangement for combating counterfeiting.

Another object of the present invention is to provide a transaction card with a personalized identification card which can be verified by visible detection and by magnetic detection.

Another object of the present invention is to provide a magnetic transaction card with a personalized identification card that can be produced economically and with facility and, yet, with improved arrangement for combating counterfeiting.

Another object of the present invention is to provide a magnetic transaction card with a personalized identification card that can be verified visually, by touch and by magnetic sensing devices.

Another object of the present invention is to provide a method for forming a magnetic transaction card that is economical to produce and, yet, enables the verification of the identity of the holder visually and by magnetic detection.

Another object of the present invention is to provide a magnetic transaction card that has a plurality of layers of plastic material with an identification card of nonmagnetic material interposed therebetween and with magnetic particles impregnated in the plastic overlay layers on the inner surfaces thereof, and wherein the plastic layers are imprinted so as to form coded indicia detectable visually, by touch and by magnetic sensing means.

Another object of the present invention is to provide a method of forming a magnetic transaction card in which an identification card is laminated between layers of plastic material; magnetic material is impregnated in the plastic overlays on the inner surfaces thereof, and the plastic layers are changed by imprinting for enabling verification of the holder of the transaction card visually, by touch and by magnetic detection.

BRIEF DESCRIPTION OF THE DRAWINGS

FIG. 1 is a diagrammatic elevational view of apparatus for forming the magnetic transaction card of the present invention;

FIG. 2 is a plan view of the magnetic transaction card of the present invention;

FIG. 3 is an enlarged vertical cross-sectional view of the magnetic transaction card shown in FIG. 2 taken at 3—3 of FIG. 2;

FIG. 4 is an enlarged vertical cross-sectional view of the magnetic transaction card illustrated in FIG. 2 showing an indented portion as made by a printing die or the like;

FIG. 5 is a fragmentary view of the magnetic transaction card taken along line 5—5 of FIG. 4;

FIG. 6 is a bottom view of the magnetic transaction card shown in FIG. 2 to illustrate the reverse side thereof;

FIG. 7 is a vertical cross-sectional view of a modification of the magnetic transaction card shown in FIGS. 2–6;

FIG. 8 is a vertical cross-sectional view of another modification of the magnetic transaction card illustrated in FIGS. 2–6, showing an indentation therein, and FIG. 9 is a vertical cross-sectional view of yet another modification of the transaction card illustrated in FIGS. 2–6.

DESCRIPTION OF THE PREFERRED EMBODIMENT

Referring now to FIG. 1, an identification card 20 is shown in position relative to two rolls 21, 22 of plastic material and moving in the direction indicated by arrow A. The identification card 20, in the preferred embodiment, is a developed picture from a camera (not shown). One camera that is available for taking quick identification pictures is the Polaroid Corporation and illustrated in their bulletin FT3799D, dated May 1967. Such a camera forms no part of the present invention, but allows pictures to be taken for identification cards in a quick and easy manner, such as during college registration when large numbers of students are to be provided with identification cards. Such a camera takes not only a picture of a student, but of other pertinent data that is printed or otherwise marked on a card so that the picture and the data are photographed at one time to produce a photograph with a picture and pertinent data thereon. Note, for example, in FIG. 2 that the photograph of the individual is shown as at B, and other identifying data is shown as at C, which might include the name of the college, the name and address of the individual, school year, and the like. Hence, an identification card, as is designated generally by the numeral 20, may be employed which illustrates for visual detection data information.

Having established the nature of the identification card 20, it is now desirable to describe the method and steps for producing a security oriented magnetic transaction card 25 that will increase the versatility of use of the card 25 and at the same time offer improved security and verification in conjunction with the use of the card 25.

Still referring to FIG. 1, the identification card 20 is moved between two pressure rollers 23, 24 so that plastic material 21a and 22a covers the upper and lower faces of card 20 as shown at D. The plastic material 21a and 22a on rollers 21 and 22 has impregnated in it, on the inner surfaces thereof, magnetic iron oxide, or, preferably, high purity chromium dioxide powder (manufactured by E.I. du Pont under the trade name CROLYN). For example, the plastic material 21a, 22a, may be vinyl chloride, and the powder would be dispersed in methylethyl ketone and applied to the surface of the plastic material, or on a cellulose acetate surface the powder could be mixed with acetone. These solvents, or solventlike materials, such as methylethyl ketone and acetone, soften or treat the surface of the plastic material such that by a combination of driers and pressure rollers a 250 to 300 micron thickness of powder or pattern of different powders can be deposited or printed on the plastic material.

Thus, with the plastic material 21a, 22a formed as described above, respective layers of magnetic powder M1 and M2 are provided which, when brought to the identification card 20 as at rollers 23, 24, will be contiguous to the card 20. Of course, it is possible that only one layer of plastic material will be impregnated with magnetic powder, and the other layer will contain only plastic material without such impregnation. It depends largely upon the variety of transactions for which the magnetic transaction card 25 will be used, as will be described in greater detail hereinafter.

In order to laminate the plastic material 21a and 22a, which has the respective magnetic M1 and M2 impregnated thereon with the identification card 20 in proper alignment, the plastic material may be provided with sprocket holes (not shown, but removable later by means such as rotating slitting knives) engageable with sprockets 23a, 24a so that the indexing of the material is in conjunction with the movement of the identification card 20 through the rollers 23, 24. When the card 20 interposed between layers of plastic material advances a predetermined distance beyond rollers 23, 24 heat sealing elements 26, 27 are positioned relative to the direction of travel of the card 20 adjacent to the plastic material to heat seal first the leading end of the card and then heat seal the trailing end of the plastic material in juxtaposition with the card as shown at E in FIG. 1. Continued movement of the card 20 encased in plastic material 21a, 22a brings the card encased in plastic material to a cutting station K where a knife 28 severs the plastic material at first at the leading end thereof and then at the trailing end thereof to form a magnetic transaction card 25. Any rough edges, sprocket holes, or the like are trimmed from the card.

Thus, as shown and described in conjunction with FIG. 1, the identification card 20 is suitably encased in juxtaposition with layers of plastic material, in which magnetic powder or particles M1 and M2 have been impregnated on the inner surfaces of the plastic layers. Since the magnetic powder has not been acted upon magnetically, the magnetic transaction card 25 insofar as magnetic powder impregnation is concerned is considered blank and is susceptible to having its magnetic properties arranged and otherwise acted upon to provide magnetically readable indicia or code thereon, as will be described hereinafter.

FIG. 2 discloses an area where magnetic powder M1, such as iron oxide or high purity chromium dioxide powder has been impregnated. An enlarged cross-sectional view of the magnetic transaction card 25 is shown in FIG. 3, which reveals that the back of the magnetic transaction card 25 also has an area of magnetic powder M1. The area of magnetic powder M2 on the back of the magnetic transaction card 25 may cover the entire rear surface of the magnetic transaction card 25 as is shown in FIG. 6.

As an example of changing the magnetic transaction card 25 so that the magnetic transaction card 25 can later be coded to be read by a magnetic read head or the like, reference is made to FIG. 4 wherein a printing die P imprints the plastic material layer 21a of magnetic transaction card 25 beyond its elastic limit. The plastic material 21a in the area where the powder M1 has been deposited now has a visible and a touch detectable imprint R while correspondingly increasing the distance between the plane surface at the top of underformed plastic layer 21a and the powder M1 beneath the imprint R. It is this displacement S which permits a suitably designed magnetic reading head to detect a magnetic void at the displacements. A suitable electronic circuit (not shown) with magnetic sensing devices can read the magnetic voids or displacements S at high speed to detect coded indicia. It is also possible, if the imprints made by the printing die P are shaped to form characters, to allow static magnetic reading of the characters formed on magnetic transaction card 25 by using such detection devices as are commercially available designed on the Hall-Effect principle. The depth of the void S is controlled by pressure on the printing die P and the elasticity and permanent deforming properties of the plastic material 21a as well as by the composition of the identification card 20 or other nonmagnetic core material sandwiched between the two layers of plastic material 21a and 22a.

The printing die P would ordinarily form imprints in the layer of magnetic material M1 of card 25 of FIG. 2. The magnetic powder M1 underlying plastic material 21a would be displaced vertically under the die P as shown in FIG. 4 to form the voids or displacements S, and the imprint would have a horizontal configuration, as shown in FIG. 5.

In FIG. 6, the reverse side of the magnetic transaction card 25 is shown having the magnetic powder M2 is coextensive with the total area of the card so that a plurality of imprints can be made by printing dies P to represent a variety of transactions that can be read by magnetic read heads, as described in conjunction with the voids or displacements S shown in FIG. 4. In this regard, the sections G may represent parking transactions, and the sections L may represent meal transactions. In other words, imprints or the like that would change the magnetic layer M2 would be read by a magnetic read head to allow the student, for example, to be identified and to pay for his meal or parking in accordance with a system designed to magnetically read the magnetic transaction card 25 with appropriate circuitry (not shown). Also, as the magnetic transaction card 25 is used, further imprinting of the plastic material could be done to change its original character to account for transactions already made. Of course, a plurality of read heads could be used to read both sides of the card or various sections of the same side of the magnetic transaction card 25.

It would also be possible to provide a layer of magnetic powder M which, in effect, would be a patterned mixture of conventional dark brown magnetic iron oxide and high purity chromium dioxide, and would be applied to the plastic material by conventional printing, silk screening, or by an electrostatic or electromagnetic process. The pattern could be impregnated in indexable fashion with relation to the sprocket holes of the plastic material such as to form a predetermined and locateable relation with some portion of the plastic card such as an edge or indexable external visible mark printed on the plastic material. Thus, a detector could later when the card is in use, refer to some specific hidden pattern location or locations to determine that the card is valid or that the external visible imprint is valid. The pattern formed by the mixture of magnetic powders would, in effect, permit identification of a bona fide transaction card usable in a bona fide manner.

The checkerboard pattern of FIG. 6 could be alternating sections of magnetic iron oxide and high purity chromium dioxide. Also, patterns of magnetic powder could also conform to an air gap design of specially designed magnetic read heads. If it were desirable to conceal the pattern, the plastic material could be coated with white lacquer or the like, or a color to conform with the card so that the pattern or magnetic powders would be hidden from view but still readable by the proper magnetic read head.

Further, in reading certain imprint characters magnetically, the pattern of magnetic powders used could convey different information than that indicated by the visible pattern. Reference is made to FIGS. 7 and 8 wherein high coercivity magnetic powders M1-H and M2-H are used in conjunction with low coercivity magnetic powders M1-L and M2-L. The imprint made by a die P would form visible characters for reading, while at the same time creating voids or displacements S for reading by a magnetic head. The difference between magnetic powders having high and low coercivity would also be detectable by the magnetic head and when the powder pattern is combined with imprints, both would influence the magnetic field. Thus, the information read magnetically could be different or the same as the information imparted by the printing die on the plastic surface.

In FIG. 9, the creation of a magnetic void or displacement $S_2$ would be occasioned by selecting a plastic material 21b having differentially deforming characteristics wherein the plastic material 21b would return elastically to its original surface conformation, but that the card 20 would deform permanently as at T under the imprint pressure of a die P, and essentially all of the magnetic powder from the inner side of the plastic material would adhere to the deformations in card 20. The plastic material 21b would be opaque or have an opaque coating and, thus, the indentations or magnetic voids would be readable magnetically, but that the characters could not be visible. Also, the magnetic powder could be made up of a mixture of various coercivity magnetic powders, such as iron oxide and/or high purity chromium dioxide to make counterfeiting cards more difficult and to convey information magnetically that would not be visually apparent.

Thus, a magnetic transaction card and a method of making such a card has been described, wherein identity of the card holder is ordinarily visible, and wherein a variety of magnetic patterns or characters may be placed on the card for further identification. Magnetic data may be concealed within the card or may conform to the character imprints on the card, or the character imprints may reveal one kind of information, whereas the magnetic information available may be completely different from the visible imprint information. Thus, the magnetic transaction card 25 provides verification by detecting coded indicia visibly, by touch and by magnetic sensing devices.

It is to be understood that modifications and variations of the embodiment of the invention disclosed herein may be resorted to without departing from the spirit of the invention and the scope of the appended claims.

Having thus described my invention, what I claim as new and desire to protect by Letters Patent is:

1. A method of producing a magnetic transaction card and sensing same comprising the steps of applying a layer of magnetic material to first and second layers of plastic material, encasing between said first and second layers a visual identification article, offsetting a portion of the magnetic material of at least one of said first and second layers from a plane adjacent a surface of the remaining portion of magnetic material of said one layer, and detecting the proximity of the magnetic material to the plane by magnetic sensing means.

2. A magnetic transaction card comprising an identification article of nonmagnetic material having visually identifiable indicia thereon; first and second layers of plastic material having magnetic material embedded in at least one surface thereof, said first and second layers encasing said identification article thereby forming magnetic fields along planes adjacent the surfaces of the magnetic material; a portion of at least one of said layers of magnetic material being offset from the plane of said magnetic material thereby to provide magnetic detectable indicia adapted to be detected by magnetic sensing means.

3. The magnetic transaction card of claim 2, wherein said magnetic material comprises a mixture of high and low coercivity materials.

4. The magnetic transaction card of claim 2 wherein said plastic layer associated with said offset magnetic material is opaque and resilient and only temporarily deformed during the offsetting, said opaque layer returning to its original position following such offsetting thereby concealing the magnetic material marking.

PO-1050
(5/69)

UNITED STATES PATENT OFFICE
CERTIFICATE OF CORRECTION

Patent No. 3,601,913                     Dated March 15, 1972

Inventor(s) MICHAEL D. POLLOCK

It is certified that error appears in the above-identified patent and that said Letters Patent are hereby corrected as shown below:

Column 2, line 63, after magnetic insert --powders--.

Signed and sealed this 13th day of June 1972.

(SEAL)
Attest:

EDWARD M. FLETCHER, JR.        ROBERT GOTTSCHALK
Attesting Officer              Commissioner of Patents